United States Patent [19]

Knoll

[11] 4,385,665
[45] May 31, 1983

[54] KINETIC ENERGY ABSORBER

[76] Inventor: Fritz Knoll, Konradigasse 21 ·D-7550 Constance, Fed. Rep. of Germany

[21] Appl. No.: 199,814

[22] Filed: Oct. 23, 1980

[30] Foreign Application Priority Data

Oct. 23, 1979 [CH] Switzerland ..................... 9509/79

[51] Int. Cl.³ .............................................. B25D 17/24
[52] U.S. Cl. ........................ 173/162 R; 173/DIG. 2; 181/207; 267/140; 188/379
[58] Field of Search ............... 173/114, 116, 134, 139, 173/162 R, DIG. 2; 181/207, 208; 267/137, 139, 140, 141, 141.2; 74/574; 188/378, 379; 92/143

[56] References Cited

U.S. PATENT DOCUMENTS

| 1,774,905 | 9/1930 | Smrdel ................................ 173/139 |
| 1,786,717 | 12/1930 | Moore et al. ................... 181/207 X |
| 2,570,577 | 10/1951 | Manion ............................ 173/162 X |
| 2,875,731 | 3/1959 | Settles et al. ........................ 267/137 |
| 3,179,185 | 4/1965 | O'Farrell ........................ 173/139 X |
| 3,334,886 | 8/1967 | Caunt ................................. 74/574 X |
| 3,511,137 | 5/1970 | Smith ............................. 173/139 X |
| 3,774,730 | 11/1973 | Maddux ............................. 188/379 |
| 3,856,107 | 12/1974 | Rabett ........................... 173/DIG. 2 |
| 4,207,957 | 6/1980 | Sivers et al. ...................... 74/574 X |

FOREIGN PATENT DOCUMENTS

| 2192250 | 2/1974 | France . |
| 411471 | 11/1966 | Switzerland . |
| 495515 | 10/1970 | Switzerland . |
| 534825 | 4/1973 | Switzerland . |
| 920586 | 3/1963 | United Kingdom . |
| 1029675 | 5/1966 | United Kingdom . |
| 1421032 | 1/1976 | United Kingdom . |
| 1421861 | 1/1976 | United Kingdom . |

Primary Examiner—James G. Smith
Assistant Examiner—Robert P. Olszewski
Attorney, Agent, or Firm—Spencer & Kaye

[57] ABSTRACT

A device for absorbing kinetic energy derived from an element oscillating in a direction parallel to a longitudinal axis of the device. The device has a housing coupled to the oscillating member and defining a chamber bounded by opposite inner end walls and an inner lateral wall of the housing. The inner end walls are generally transverse to and the inner lateral wall is generally parallel with the axis of the device. An oscillation quencher body which is situated in the chamber, has opposite end faces oriented towards respective inner end walls and a lateral face oriented towards the inner lateral wall. A resiliently deformable impact member is situated between each end face of the body and a respective inner end wall of the housing. Further, at least one groove is provided in the lateral face of the body. The groove has a length generally transverse to and a width generally parallel with the device axis. A compressible solid rolling body is received in the groove and engages the inner lateral wall of the housing.

15 Claims, 7 Drawing Figures

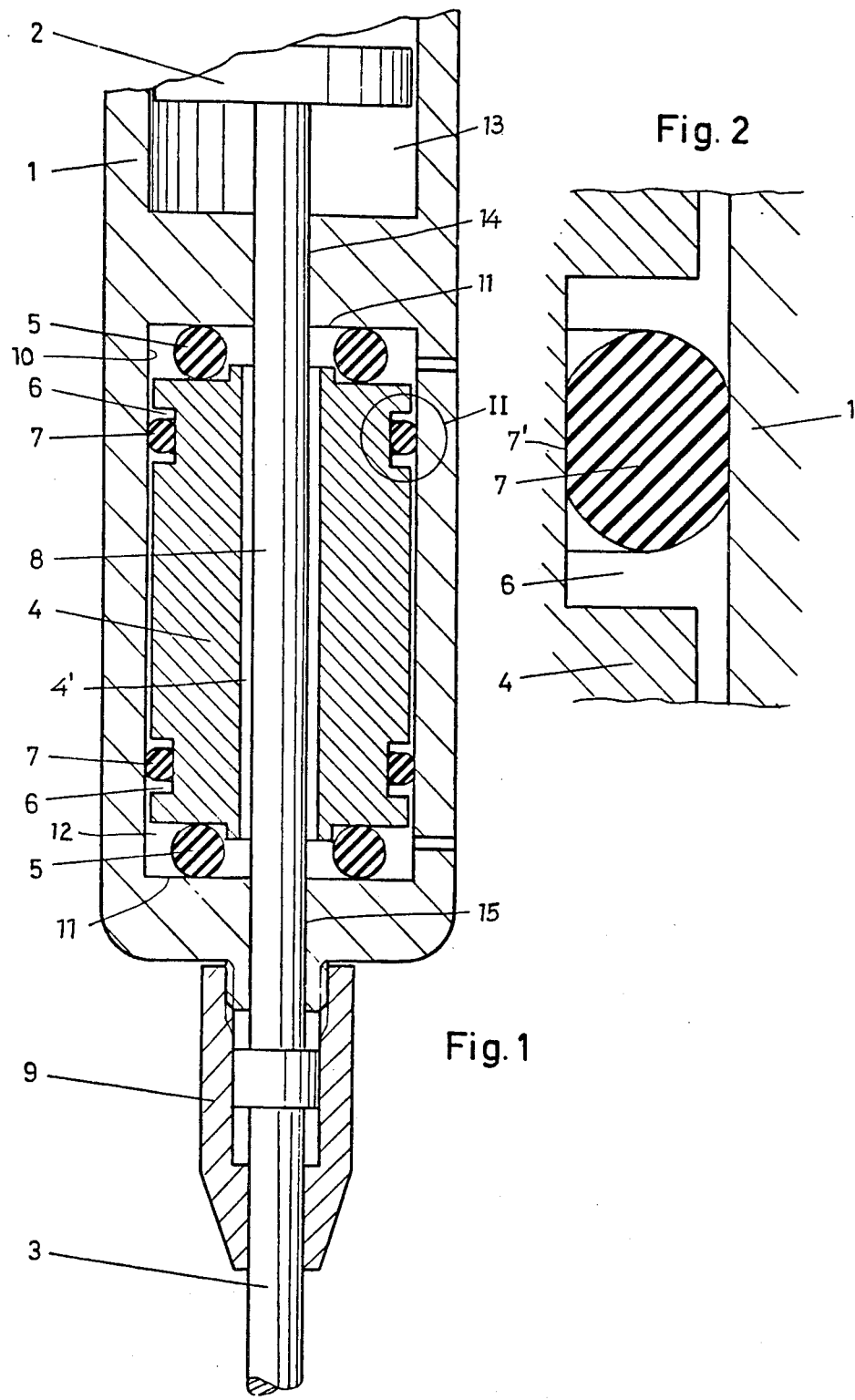

KINETIC ENERGY ABSORBER

BACKGROUND OF THE INVENTION

This invention relates to a device for absorbing kinetic energy and is of the type which has two coaxially arranged bodies coupled to one another by means of a connecting mechanism.

Devices of the above-outlined type may find application in a wide variety of environments, such as shock absorption, energy absorption, oscillation damping or oscillation quenching. It is a common characteristic of these devices that they have a first part which is coupled with the impulse or shock generator and a second part which functions as an energy absorbing mass and there is further provided a coupling medium which transfers energy from the first part to the second part.

In a known arrangement of the aforenoted type, as disclosed in Swiss Pat. No. 495,515, the coupling medium comprises a sheet metal stack for supporting the energy absorbing mass on the inner housing wall of the device. A viscous liquid in the damping housing entirely surrounds the damping (energy absorbing) mass as well as the sheet metal stacks.

In Swiss Pat. No. 534,825, there is disclosed an energy absorber which may move freely in one of two possible directions of motion, but which is opposed by an energy absorbing force in the other direction of motion. The absorbing force is generated by means of an elastomer sleeve into which spheres are pressed by a surrounding housing. In this device the constant volume of the synthetic elastomer material is utilized, namely the property according to which under the effect of deforming forces the volume remains essentially unchanged and a deformation results by the compression of the material in the one direction and an expansion in the other direction. During motion in the direction in which energy is absorbed, the spheres are pressed radially inwardly by means of a conical wall, so that in the elastomer material there is obtained a zone which is compressed in the radial direction and expanded in the longitudinal direction. In the course of such a deformation energy is absorbed.

A shock absorber according to Swiss Pat. No. 411,471 comprises a chamber which contains a piston and a flowable material, such as silicon rubber, in a solid aggregate state. The force to be dampened is exerted on the piston rod. The energy absorption occurs in part by conversion into frictional force and in part by conversion into sheering force; such forces can be taken up by the material.

SUMMARY OF THE INVENTION

It is an object of the invention to provide an improved device of the above-outlined type which absorbs energy in such a manner that oscillations are not only dampened but are directly quenched substantially independently from the frequency of oscillation.

This object and others to become apparent as the specification progresses, are accomplished by the invention, according to which, briefly stated, the device has a housing including a chamber bounded by opposite inner end walls and an inner lateral wall of the housing. The inner end walls are generally transverse to and the inner lateral wall is generally parallel with the direction of oscillation imparted externally to the housing. An oscillation quencher body which is situated in the chamber has opposite end faces oriented towards respective inner end walls and a lateral face oriented towards the inner lateral wall. A resiliently deformable member is situated between each end face of the body and a respective inner end wall of the housing. A groove is provided in the lateral face of the body; the groove has a length generally transverse to and a width generally parallel with the direction of oscillation. A compressible solid rolling body is received in the groove and engages the quencher body and the housing.

BRIEF DESCRIPTION OF THE DRAWING

FIG. 1 is an axial sectional view of a part of a hand tool incorporating a preferred embodiment of the invention.

FIG. 2 is an enlarged illustration of the inset II in FIG. 1.

DESCRIPTION OF THE PREFERRED EMBODIMENTS

Figure 3A:
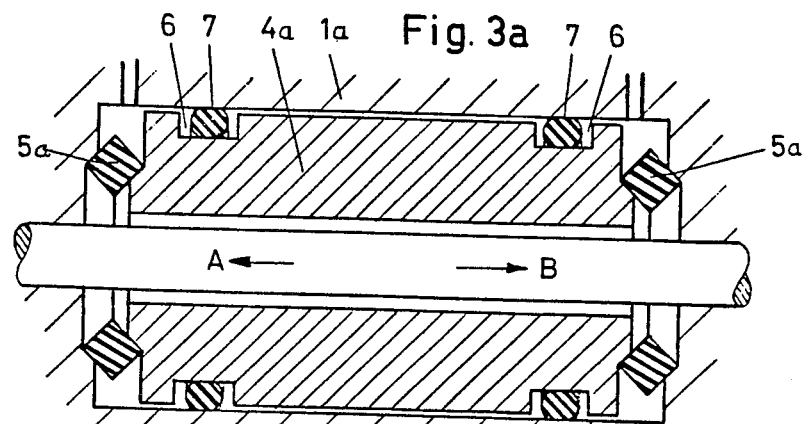
FIGS. 3a and 3b are axial sectional views of another embodiment of the invention, illustrating different operational positions.

Turning now to FIG. 1, there is illustrated one part of a hand tool having a housing 1 in which a cylindrical inner lateral wall 10 and opposite end walls 11 together define a housing chamber 12. The housing 1 further has a work chamber 13 in which reciprocates a conventionally actuated drive piston 2 which functions as the tool drive such as a pneumatic or electromagnetic oscillating drive. The outer face of the housing 1 of the hand tool serves as a manual grasping surface during operation.

In the chamber 12 there is accommodated a cylindrical body 4 functioning as an oscillation quencher. Its opposite end faces are oriented to respective end walls 11 of the chamber 12. At each end of the oscillation quencher 4, between the end face thereof and the adjacent end wall 11 there is disposed a resilient impact ring 5 made, for example of polybutadiene. The impact rings 5 which, in the embodiment illustrated, have a circular cross section, support the oscillation quencher 4 on the two opposite end walls 11 of the housing 1. The quencher 4 may preferably be made of tungsten, steel, copper, alloys of copper but also of other materials.

The oscillation quencher 4 has two axially spaced circumferential grooves 6 in which are received respective deformable rolling rings 7 which are, according to the embodiment shown in FIGS. 1 and 2, of circular cross section in the unstressed state and which may be made of an elastomer or other resilient material. The rolling rings 7 are thus in engagement with the base of the respective groove 6 and with the cylindrical wall 10 of the housing 1.

The piston 2 is coupled in a guide sleeve 9 by means of a piston rod 8 with an oscillating tool bit such as a file, a saw, a grinder or the like. The piston rod 8 which is supported in the housing 1 by means of two axially spaced slide bearings 14 and 15, passes with an annular clearance through an axial opening 4' provided in the body 4. FIG. 2 which shows the inset II of FIG. 1 on an enlarged scale, illustrates one of the grooves 6 with the associated rolling ring 7 which is deformed between the housing 1 and the groove base. It may be observed that the axially measured width of the groove 6 is more than twice the axially measured length of the radial pressuredependent engagement face 7' of the rolling ring 7. Further, the axially measured width of the groove 6 is 1.5 times the axially measured thickness diameter of the compressed rolling ring 7.

For the sake of clarity, parting lines in the housing 1, facilitating assembly and installation of the oscillation quencher 4 are not shown.

The kinetic energy absorber formed of components 4 through 7 operates as follows:

From the drive piston 2 oscillations in the frequency range of approximately 30 to 200 cycles per second are transferred to the housing 1. These oscillations are transferred from the housing to the rolling rings 7 which, in turn, transmit them to the oscillation quencher 4. The latter moves with a 180° phase shift with respect to the oscillation of the housing 1, while the rolling rings 7 roll corresponding to the oscillations, back and forth on the wall 10 of the housing 1 and on the base of the respective groove 6. Since the rolling rings 7 are in a deformed condition in the device even in the state of rest, such a deformation is preserved during the rolling motion and the force which is necessary for deforming the rolling rings 7 utilizes one part of the energy.

With the use of elastomer rolling rings 7 various damping modes may be combined, each formed of a deforming force. Thus, a frictional damping is effected by rolling friction of the rolling rings 7 and, due to the deformation, there is obtained a viscous damping to which may be added an exponential velocity damping as well: the energy transmission from the housing 1 to the oscillation quencher 4 is effected by an exponential velocity damping force with the intermediary of the impact rings 5.

The adaptation of the oscillation absorber 4-7 to a wide frequency spectrum is effected by providing that the drive of the oscillation quencher 4 occurs through the impact rings 5 as influenced by the rolling rings 7. The impact rings 5 are so constructed that the force/-displacement function is exponential so that the tuning of frequency between the housing 1, the oscillation quencher 4 and the impact rings 5 sets itself automatically to a frequency within a wide band in which the upper frequency limit is approximately five times the lower frequency limit. As the rolling rings 7 transmit additional displacement forces from the housing 1 to the oscillation quencher 4 and conversely, the natural resonance conditions of the oscillating system are additionally corrected.

Figure 3B:
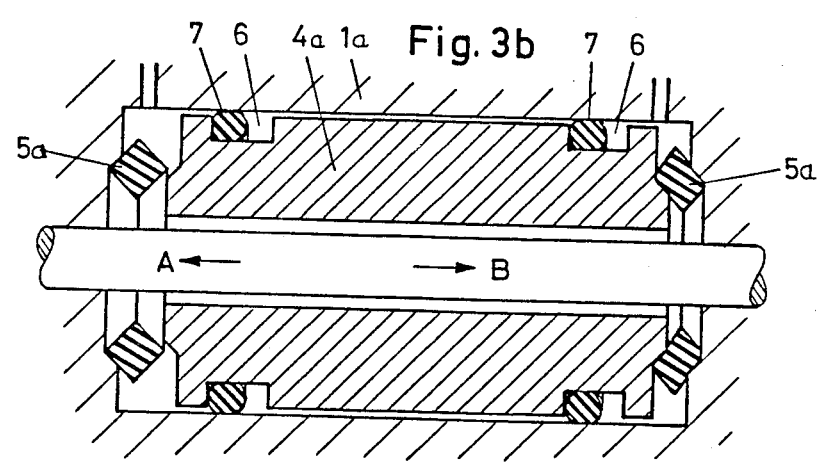

FIGS. 3a and 3b illustrate a slightly modified oscillating structure in two operational positions. FIG. 3a illustrates a mid position while FIG. 3b shows an end position when the oscillation quencher 4a is in its extreme right-hand position. The impact rings 5a are of quadrilateral cross section with such an orientation that the two diagonals of such cross section have an axial and, respectively, a radial orientation with respect to the body 4a.

The oscillation quencher 4a is excited by the housing 1a with the intermediary of the impact rings 5a and the rolling rings 7. As the piston rod 8 moves cyclically in the direction of the arrows A and B, it transmits one part of the displacement force to the housing 1a. The impact rings 5a assume such displacement and cause the oscillation quencher 4a to execute oscillations whereby the impact rings 5a are deformed, as shown for the right-hand impact ring 5a in FIG. 3b. The oscillation quencher 4a therefore oscillates with a 180° phase shift with respect to the housing 1a. This oppositely oriented oscillation is transmitted back to the housing 1a by means of the rolling rings 7 so that the displacements almost entirely cancel out.

Figure 4A:
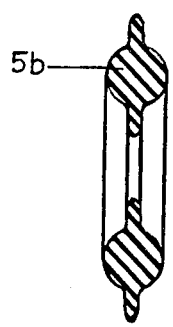
FIGS. 4a, 4b and 4c are sectional views of three variants of a component of the device according to the invention.
Figure 4B:
Figure 4C:

Turning now to FIG. 4, there are illustrated in section three impact ring variants 5b, 5c and 5d. Cross-sectionally viewed, each ring has a particular force/displacement curve and they may be selected dependent upon the magnitude of the oscillation to be quenched and dependent upon the frequency band in which the anticipated oscillations lie. It is added that the impact rings may have a rectangular cross section with a thickened portion; the longer side of such a rectangle is oriented radially with respect to the longitudinal axis of the device.

EXAMPLE

In a test tool 1, 2, 3, according to FIG. 1 the following magnitudes were measured:

Oscillation amplitude of the housing 1 without the energy absorber 4, 5, 6, 7: 0.68 mm.

Oscillation amplitude of the housing 1 with an energy absorber 4, 5 (no rolling rings 7): 0.15 mm.

Oscillation amplitude of the housing 1 with the entire device 4, 5, 6, 7 according to FIG. 1: 0.03 mm.

The above results clearly show that an oppositely (180° out-of-phase) oscillating device is not sufficient for the best results; there is needed a feedback by means of the rolling rings 7 in order to obtain an effective quenching of the oscillations. Because of the wide frequency band, even oscillations at start are substantially reduced.

The oscillation quencher 4 need not be cylindrical; it may be, for example, of quadratic cross section in which case a plurality of milled linear transverse grooves receive individual linear portions of rolling bodies which engage planar inner wall faces of the housing. It is noted, however, that a cylindrical embodiment is simpler to manufacture.

It will be understood that the above description of the present invention is susceptible to various modifications, changes and adaptations, and the same are intended to be comprehended within the meaning and range of equivalents of the appended claims.

What is claimed is:

1. A device for absorbing kinetic energy derived from an element oscillating in a direction parallel to a longitudinal axis of the device, comprising:
    (a) a housing coupled to said element and defining a chamber bounded by opposite inner end walls and an inner lateral wall of said housing; said inner end walls being generally transverse to and said inner lateral wall being generally parallel with said axis;
    (b) an oscillation quencher body situated in said chamber spaced from said inner walls; said body having opposite end faces oriented towards respective said inner end walls and a lateral face oriented towards said inner lateral wall;
    (c) a resiliently deformable impact member situated between each said end face of said body and a respective said inner end wall of said housing; each impact member being structured such that an exponential relationship exists between a deformation of the impact member and a resilient counterforce generated thereby by the deformation;
    (d) means defining at least one groove having a base spaced from said inner lateral wall of said housing at a predetermined distance; said base having a width generally parallel with said axis; and (e) a compressible solid rolling body received in said groove and having a cross-sectional diameter; said rolling body circumferentially engaging said base of said groove and said inner lateral wall of said housing; further wherein said predetermined distance is less than said cross-sectional diameter, whereby said rolling body is in a cross-sectionally compressed state; and further wherein said width of said base is greater than the dimension of the cross section of the compressed rolling body measured parallel to said axis, whereby a relative axial displacement between said housing and said quencher body effects a rolling displacement of said rolling body within and relative to said groove parallel to said axis.

2. A device as defined in claim 1, wherein said element oscillating in a predetermined direction is an elongated component whose length dimension coincides with said predetermined direction of oscillation; further wherein said oscillation quencher body has an axial central throughgoing opening through which said elongated component passes with a clearance; and further comprising bearing means in said housing for supporting said elongated component.

3. A device as defined in claim 1, wherein said inner lateral wall of said housing and said lateral face of said body are cylindrical and further wherein said rolling body is a rolling ring.

4. A device as defined in claim 1, wherein said rolling body engaging said inner lateral wall of said housing over an area having a length measured parallel to said width of said base; said width of said base being more than twice the length of said area.

5. A device as defined in claim 4, wherein the compressed rolling body has a thickness diameter measured in a direction parallel with said width of said base; said width of said base being 1.5 times said thickness diameter.

6. A device as defined in claim 3, wherein said rolling ring has a circular cross section.

7. A device as defined in claim 1, wherein each impact member is annular.

8. A device as defined in claim 1, wherein each impact member has a circular cross section.

9. A device as defined in claim 1, wherein each impact member has a quadrilateral cross section and further wherein the two diagonals of said quadrilateral cross section are parallel with and, respectively, perpendicular to said axis.

10. A device as defined in claim 1, wherein each impact member has a rectangular cross section having opposite long sides and opposite short sides; said cross section further having an enlargement; said long sides being oriented radially with respect to said axis.

11. A device as defined in claim 1, wherein said impact members are of polybutadiene.

12. A device as defined in claim 1, wherein said housing is a power tool housing and further wherein said housing has an outer surface constituting a manually engageable grasping face.

13. A device as defined in claim 1, wherein said rolling body is an elastic material.

14. A device as defined in claim 13, wherein said elastic material is an elastomer.

15. A device as defined in claim 1, wherein said groove is located in the lateral face of the quencher body.

* * * * *